United States Patent
Ge et al.

(10) Patent No.: US 11,165,502 B2
(45) Date of Patent: Nov. 2, 2021

(54) OPTICAL TRANSMISSION DEVICE AND OPTICAL TRANSMISSION SYSTEM

(71) Applicant: FUJITSU LIMITED, Kanagawa (JP)

(72) Inventors: Yi Ge, Bunkyo (JP); Shoichiro Oda, Fuchu (JP); Yuichi Akiyama, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/506,199

(22) Filed: Jul. 9, 2019

(65) Prior Publication Data
US 2020/0036446 A1    Jan. 30, 2020

(30) Foreign Application Priority Data

Jul. 25, 2018    (JP) .............................. 2018-139026

(51) Int. Cl.
| | |
|---|---|
| *H04B 10/294* | (2013.01) |
| *H04J 14/02* | (2006.01) |
| *H04B 10/075* | (2013.01) |
| *H04L 25/03* | (2006.01) |
| *G02F 7/00* | (2006.01) |

(52) U.S. Cl.
CPC ....... *H04B 10/2941* (2013.01); *H04B 10/075* (2013.01); *H04J 14/0221* (2013.01); *H04L 25/03878* (2013.01); *G02F 7/00* (2013.01)

(58) Field of Classification Search
CPC .............. H04B 10/2941; H04B 10/075; H04J 14/0221; H04L 25/03878; G02F 7/00
See application file for complete search history.

(56) References Cited

U.S. PATENT DOCUMENTS

| | | | | |
|---|---|---|---|---|
| 5,349,461 | A * | 9/1994 | Huynh ............... | H04B 10/2589 398/41 |
| 5,717,510 | A * | 2/1998 | Ishikawa ............ | H04B 10/0795 398/147 |
| 6,532,320 | B1 * | 3/2003 | Kikuchi ................. | H04J 14/02 385/15 |
| 7,426,235 | B1 * | 9/2008 | Anderson ......... | H04L 25/03343 375/221 |
| 7,522,845 | B2 * | 4/2009 | Lautenschlager ..... | H01S 5/0687 372/32 |

(Continued)

FOREIGN PATENT DOCUMENTS

| | | |
|---|---|---|
| JP | 2001-251245 | 9/2001 |
| JP | 2015-513278 | 4/2015 |
| WO | 2013/143976 | 10/2013 |

*Primary Examiner* — Mina M Shalaby
(74) *Attorney, Agent, or Firm* — Fujitsu Patent Center

(57) ABSTRACT

An optical transmission device includes: a frontend circuit, a converter, an equalizer, a recovery, spectrum detector a correction information generator, and a transmitter. The frontend circuit converts an optical signal received via an optical network into an electric signal. The converter converts an output signal of the frontend circuit into a digital signal. The equalizer equalizes the digital signal or a second digital signal that is generated based on the digital signal. The recovery recovers a symbol from an output signal of the equalizer. The spectrum detector detects a reception spectrum of the optical signal based on the digital signal or the second digital signal. The correction information generator generates, according to the reception spectrum, correction information for correcting a shape of a transmission spectrum of the optical signal. The transmitter transmits the correction information to the source device.

12 Claims, 13 Drawing Sheets

(56) References Cited

U.S. PATENT DOCUMENTS

| | | | |
|---|---|---|---|
| 7,725,033 B2* | 5/2010 | Nakamoto | H04J 14/0221 398/159 |
| 8,041,226 B2* | 10/2011 | Kato | H04B 10/40 375/232 |
| 8,660,437 B1* | 2/2014 | Blauvelt | H04B 10/07957 398/136 |
| 9,571,198 B2* | 2/2017 | Kan | H04B 10/40 |
| 10,050,710 B2* | 8/2018 | Anandakumar | H04B 10/2507 |
| 2001/0019436 A1 | 9/2001 | Nakajima et al. | |
| 2003/0025957 A1* | 2/2003 | Jayakumar | H04B 10/00 398/5 |
| 2005/0195893 A1* | 9/2005 | Brunn | H04L 25/03019 375/232 |
| 2006/0262229 A1* | 11/2006 | Takeda | H04N 21/44209 348/725 |
| 2008/0089692 A1* | 4/2008 | Sorin | H04J 14/02 398/135 |
| 2010/0124418 A1* | 5/2010 | Noble | H04B 10/0779 398/9 |
| 2010/0266006 A1* | 10/2010 | Werner | H04L 25/03057 375/232 |
| 2012/0249871 A1* | 10/2012 | Nguyen | G09G 5/006 348/441 |
| 2013/0071108 A1* | 3/2013 | Park | H04B 10/572 398/27 |
| 2015/0023674 A1* | 1/2015 | Salsi | H04B 10/2575 398/202 |
| 2015/0037034 A1 | 2/2015 | Renaudier et al. | |
| 2015/0071636 A1* | 3/2015 | Hu | H04L 47/25 398/52 |
| 2015/0131987 A1* | 5/2015 | Yang | H04B 10/077 398/16 |
| 2016/0164703 A1* | 6/2016 | Stone | H04L 25/03159 398/140 |
| 2018/0019814 A1* | 1/2018 | Fludger | H04B 10/0799 |
| 2018/0198522 A1* | 7/2018 | Mochizuki | H04B 10/572 |

* cited by examiner

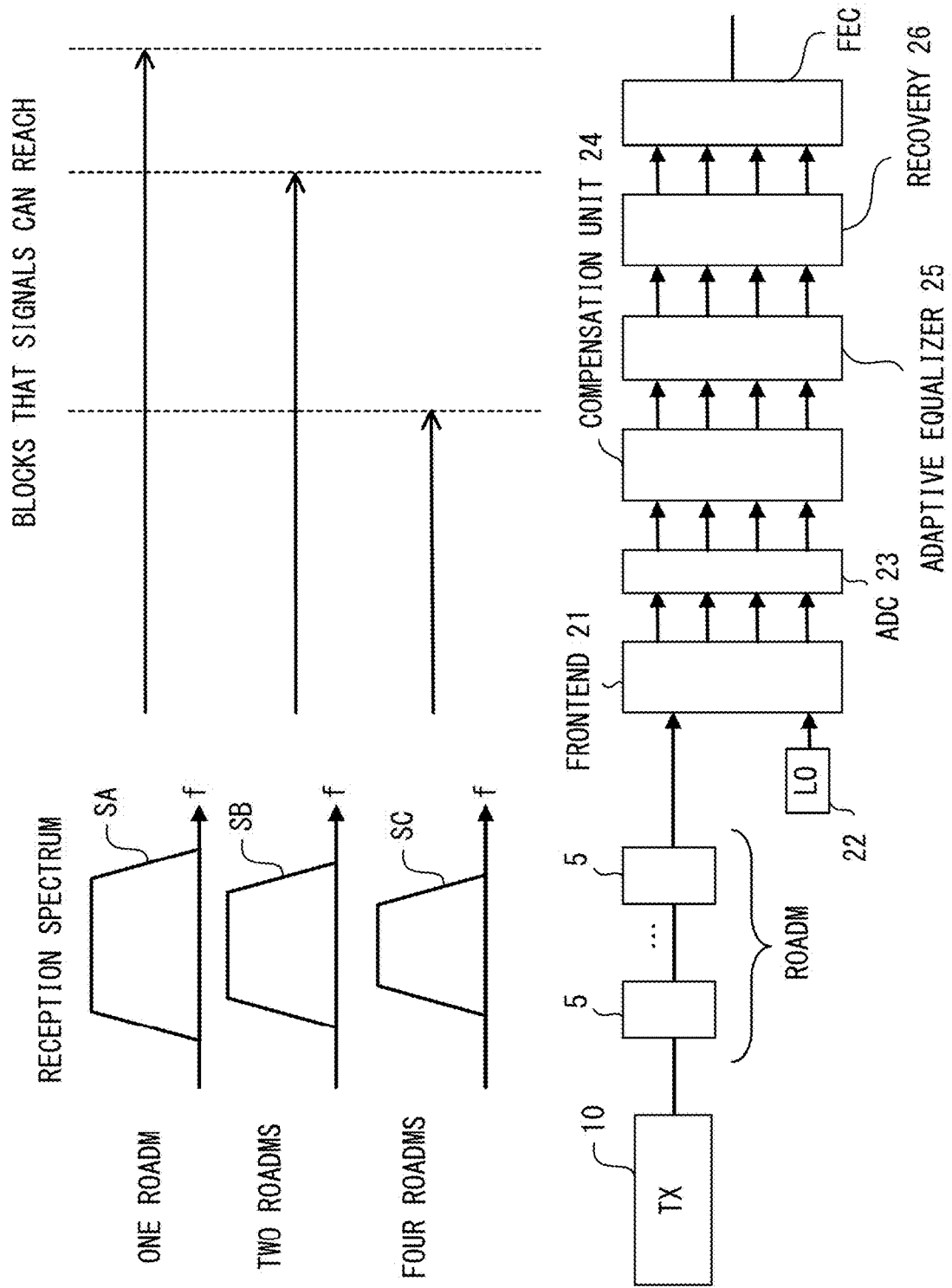
F I G. 5

F I G. 6 A
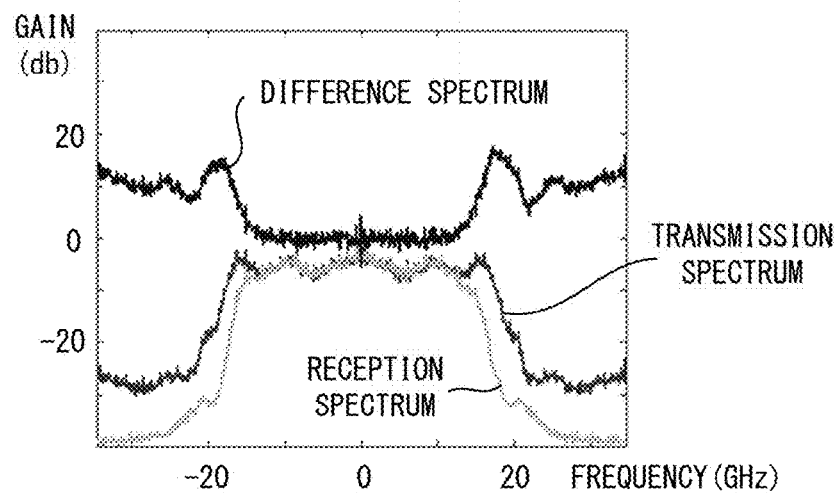
F I G. 6 B
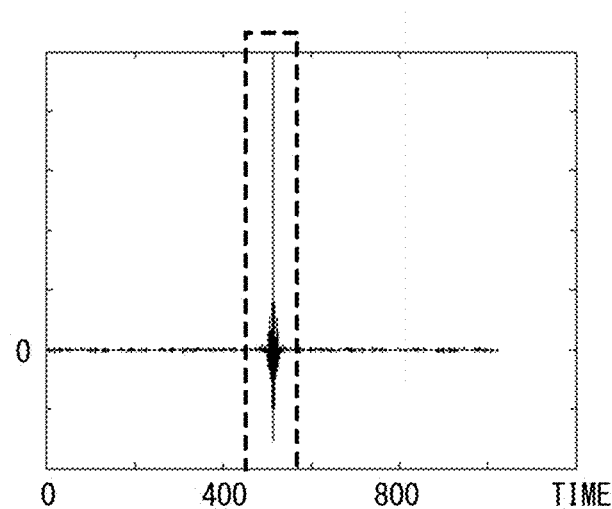
F I G. 6 C
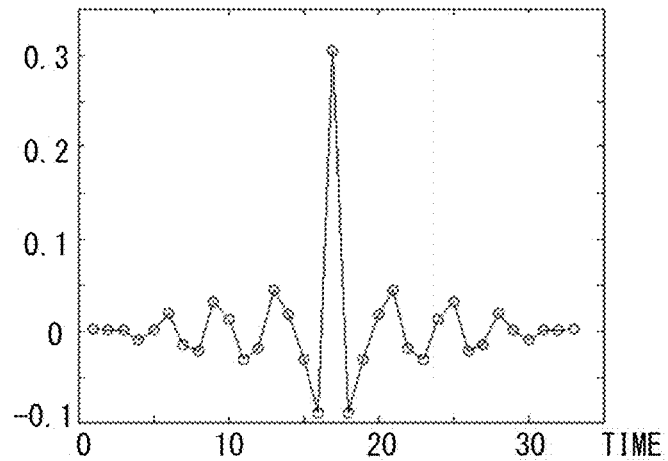

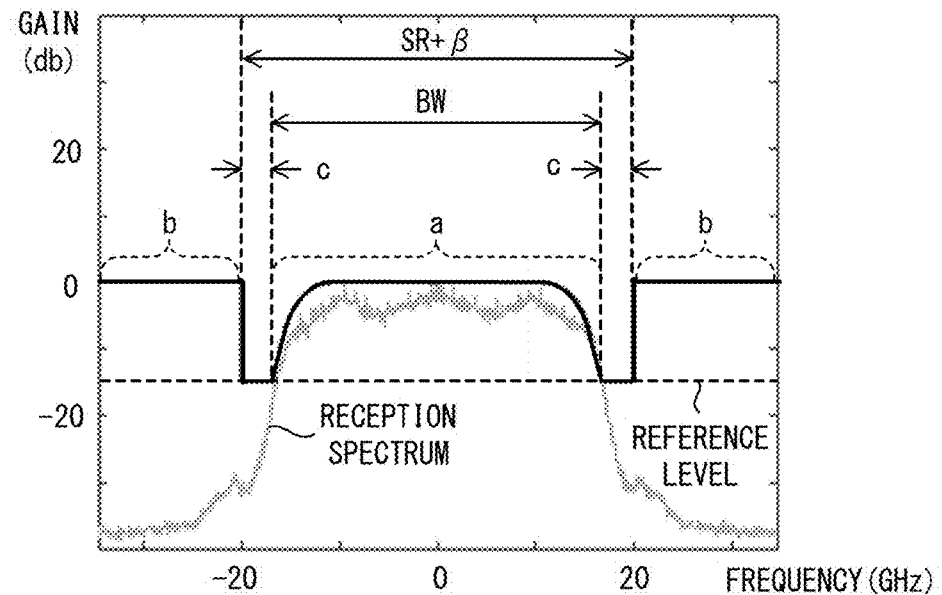
F I G. 7

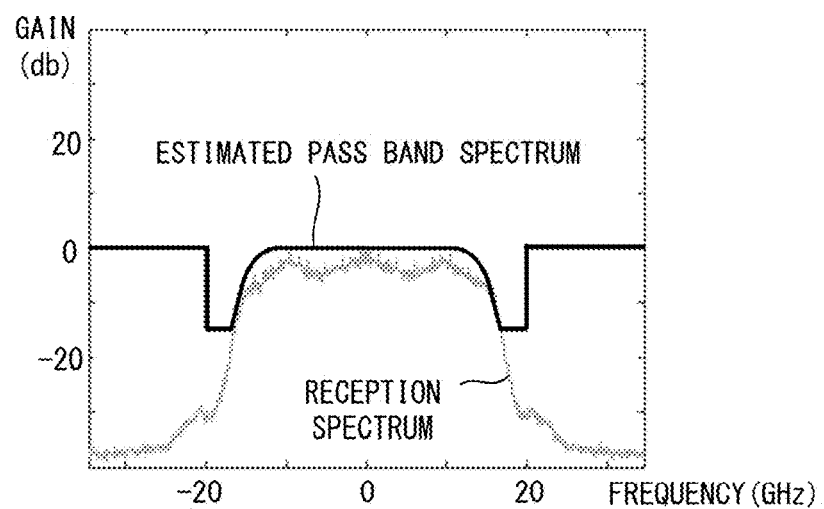
F I G. 8 A
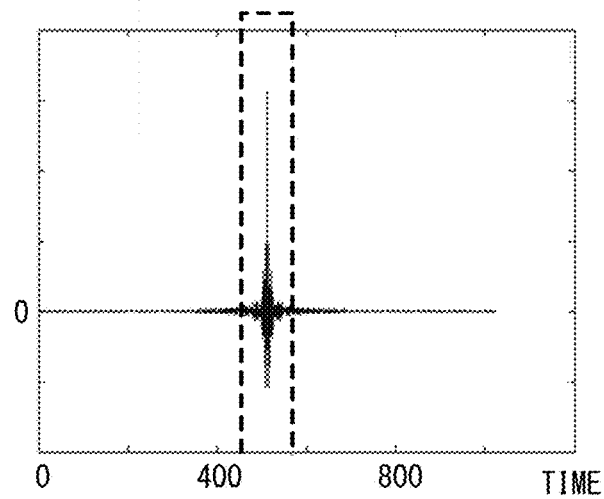
F I G. 8 B
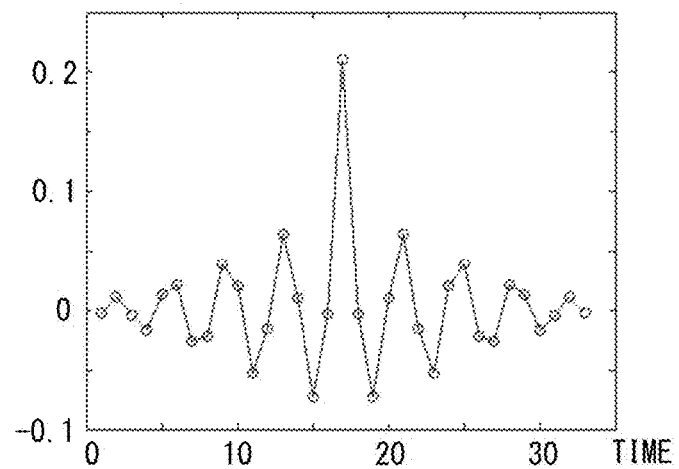
F I G. 8 C

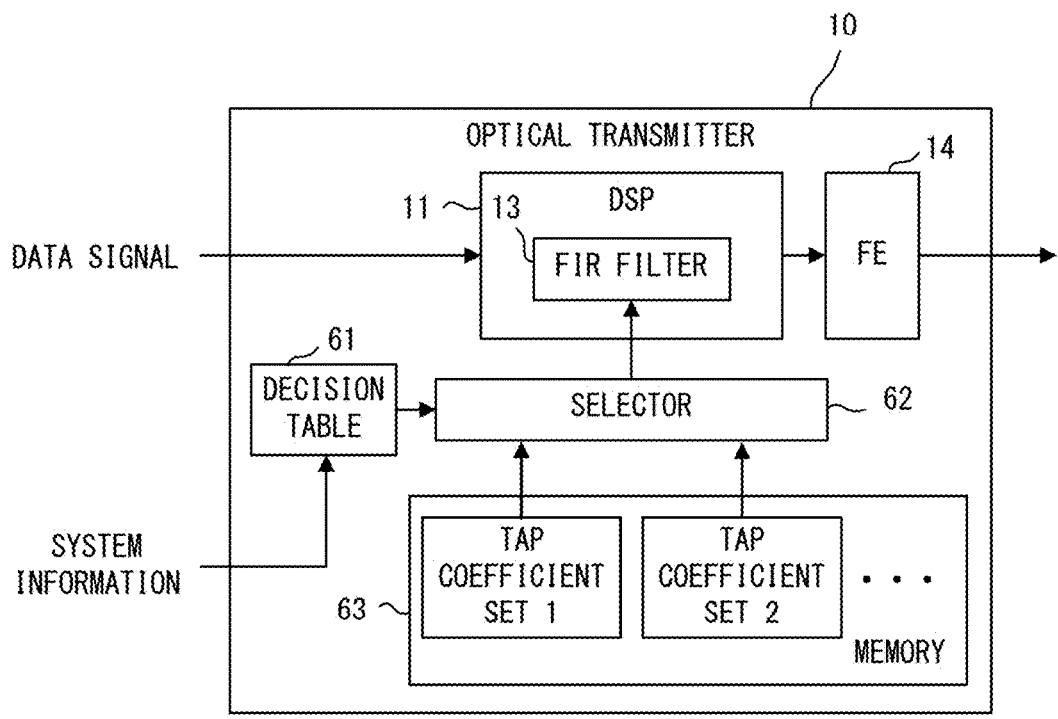
F I G. 1 2

OPTICAL TRANSMISSION DEVICE AND OPTICAL TRANSMISSION SYSTEM

CROSS-REFERENCE TO RELATED APPLICATION

This application is based upon and claims the benefit of priority of the prior Japanese Patent Application No. 2018-139026, filed on Jul. 25, 2018, the entire contents of which are incorporated herein by reference.

FIELD

The embodiments discussed herein are related to an optical transmission device and an optical transmission system.

BACKGROUND

Wavelength division multiplexing (WDM) has been widely used to provide a large-capacity, high-speed optical fiber network. A plurality of optical signals of different wavelengths are multiplexed in a WDM transmission.

Each node in an optical fiber network for transmitting a WDM signal is provided with, for example, a reconfigurable optical add drop multiplexer (ROADM). The ROADM includes a wavelength selective switch (WSS). The WSS can drop an optical signal of a specified wavelength channel from a WDM signal. In addition, the WSS can add an optical signal to an available channel of the WDM signal. In particular, the WSS may process an optical signal for each wavelength channel.

In recent years, narrower bandwidths have been allocated to individual wavelength channels in the optical fiber network so as to enhance the efficiency of utilization of the frequency band of the optical fiber. As an example, a bandwidth of 37.5 GHz may be allocated to a wavelength channel for carrying a signal of 34 Gbaud.

In the meantime, when an optical signal is forwarded via a plurality of ROADMs (i.e., a plurality of WSSs), the quality of this optical signal may be decreased in a receiver node due to pass band narrowing (PBN). An optical signal may be severely degraded particularly when the wavelength channels are arranged at narrow intervals and the margin of the transmission bandwidth of each of the wavelength channels of the WSSs is small with respect to the bandwidth of the optical signal.

An optical transmission system has been proposed wherein pre-emphasis for a transmission signal is performed to reduce degradation that could be caused by PBN (e.g., Japanese National Publication of International Patent Application No. 2015-513278). An optical receiver of this optical transmission system decides a symbol after dispersion compensation, clock recovery, polarization demultiplexing/ equalization, and carrier frequency/carrier phase estimation are performed. The polarization demultiplexing/equalization is implemented by determining tap coefficients for a FIR filter in accordance with, for example, a constant modulus algorithm (CMA). Then, a transmitter node performs pre-emphasis for a transmission signal by performing feedback control based on the determined tap coefficients. Another proposed configuration is such that transmission properties in a WDM optical communication system are equalized and optimized effectively while reducing the burden on pre-emphasis (e.g., Japanese Laid-open Patent Publication No. 2001-251245).

The prior art for reducing degradation that could be caused by PBN (e.g., the configuration described in Japanese National Publication of International Patent Application No. 2015-513278) requires that polarization demultiplexing/equalization be correctly performed. Hence, if a received signal has been severely degraded, polarization demultiplexing/equalization is not correctly performed, thereby making it difficult to perform appropriate feedback control. In this case, appropriate pre-emphasis for a transmission signal is not performed, and the quality of a received signal is not improved. If the tap coefficients of a FIR filter are not converged by polarization demultiplexing/equalization, it will be difficult to perform feedback control.

SUMMARY

According to an aspect of the present invention, an optical transmission device includes: a frontend circuit configured to convert an optical signal received via an optical network into an electric signal; a converter configured to convert an output signal of the frontend circuit into a digital signal; an equalizer provided on an output side of the converter and configured to equalize the digital signal or a second digital signal that is generated based on the digital signal; a recovery configured to recover a symbol from an output signal of the equalizer; a spectrum detector configured to detect a reception spectrum of the optical signal based on the digital signal or the second digital signal; a correction information generator configured to generate, according to the reception spectrum detected by the spectrum detector, correction information for correcting a shape of a transmission spectrum of the optical signal in a source device that is a source of the optical signal; and a transmitter configured to transmit the correction information to the source device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates advantageous effects of embodiments of the invention;

FIGS. 6A-6C illustrate an example of a method for generating correction information in accordance with a first embodiment;

FIG. 7 illustrates an example of a method for producing an estimated pass band spectrum;

FIGS. 8A-8C illustrate an example of a method for generating correction information in accordance with a second embodiment;

FIG. 12 illustrates an example of an optical transmitter in accordance with a fifth embodiment.

DESCRIPTION OF EMBODIMENTS

Figure 1:
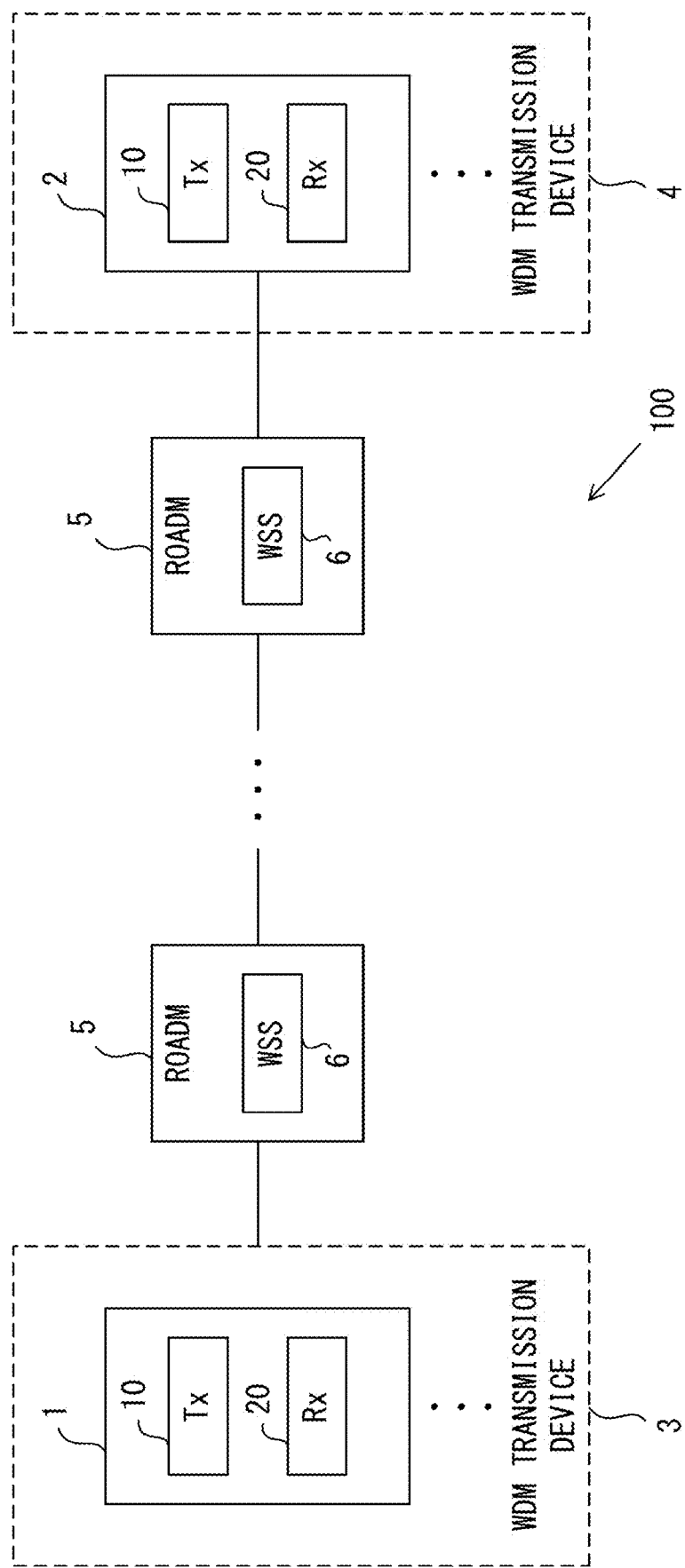
FIG. 1 illustrates an example of an optical transmission system in accordance with embodiments of the present invention.

FIG. 1 illustrates an example of an optical transmission system in accordance with embodiments of the present invention. An optical signal is transmitted between optical transceivers 1 and 2 in an optical transmission system 100 depicted in FIG. 1. The optical transceivers 1 and 2 each include an optical transmitter 10 and an optical receiver 20. The optical transceivers 1 and 2 are implemented in WDM transmission devices 3 and 4, respectively. The optical transceivers 1 and 2 are examples of the optical transmission device.

The WDM transmission device 3 includes a plurality of optical transceivers 1. The WDM transmission device 3 generates a WDM signal by multiplexing optical signals generated by the plurality of optical transceivers 1. This WDM signal is output to an optical network. The WDM transmission device 3 demultiplexes a WDM signal received via the optical network for respective wavelength channels. Each optical signal is guided to a corresponding optical transceiver 1.

Similarly, the WDM transmission device 4 includes a plurality of optical transceivers 2. The WDM transmission device 4 generates a WDM signal by multiplexing optical signals generated by the plurality of optical transceivers 3. This WDM signal is output to the optical network. The WDM transmission device 4 demultiplexes a WDM signal received via the optical network for respective wavelength channels. Each optical signal is guided to a corresponding optical transceiver 2.

A ROADM 5 is implemented in each node in the optical network. The ROADM 5 includes a WSS 6. The ROADM 5 processes a WDM signal by using the WSS 6. In particular, the ROADM 5 may drop an optical signal of a designated wavelength channel from the WDM signal. The ROADM 5 may add an optical signal to an available channel of the WDM signal.

Data may be transmitted from the optical transceiver 1 to the optical transceiver 2 in the optical transmission system 100. In particular, data may be transmitted from the optical transmitter 10 implemented in the optical transceiver 1 to the optical receiver 20 implemented in the optical transceiver 2. Accordingly, the optical transceiver 1 may hereinafter be referred to as a source device. The optical transceiver 2 may hereinafter be referred to as a destination device.

Figure 2:
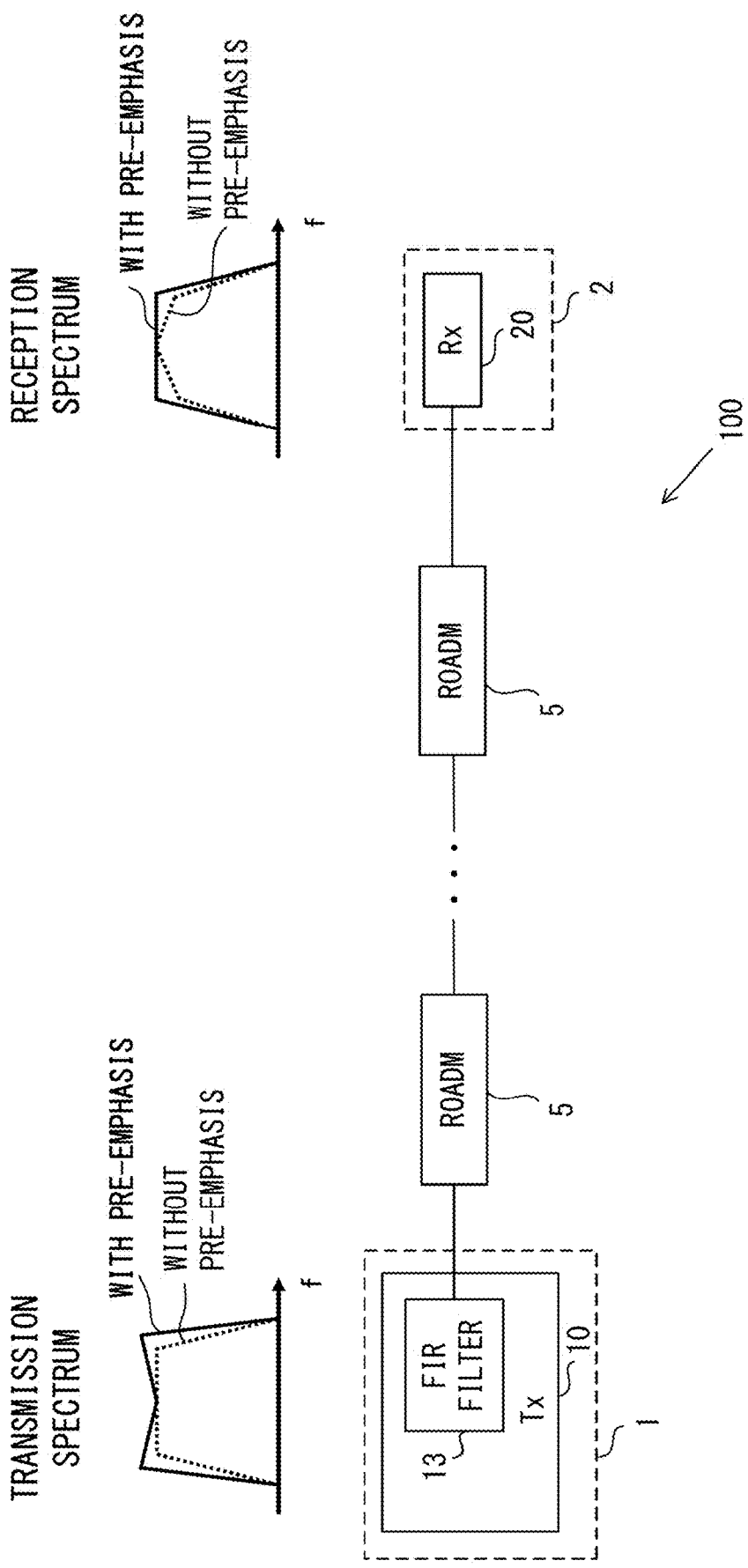
FIG. 2 illustrates an example of pre-emphasis in accordance with embodiments of the invention.

FIG. 2 illustrates an example of pre-emphasis in accordance with embodiments of the invention. In the example depicted in FIG. 2, an optical signal is transmitted from the optical transmitter 10 implemented in the optical transceiver 1 to the optical receiver 20 implemented in the optical transceiver 2. In this example, a plurality of ROADMs are provided between the optical transceivers 1 and 2. Each ROADM 5 may process optical signals of individual wavelengths by using the WSS 6.

An optical signal transmitted from the optical transmitter 10 is filtered by the WSS 6 at each ROADM 5. Hence, the spectrum of the optical signal is degraded due to PBN (pass band narrowing). Transmission spectra and reception spectra provided when pre-emphasis is not performed are represented by dotted lines in FIG. 2.

The optical receiver 20 monitors the spectrum of a received optical signal so as to reduce degradation of a reception spectrum that could be caused by PBN. On the basis of the reception spectrum, the optical receiver 20 generates correction information for allowing the source device (i.e., optical transmitter 10) that is the source of the optical signal to correct the shape of the transmission spectrum of this optical signal. The correction information is realized by, for example, the tap coefficients of a digital filter (FIR filter 13 in this example) for correcting the shape of the transmission spectrum of the optical signal in the optical transmitter 10.

The optical receiver 20 transmits the generated correction information to the optical transmitter 10. In particular, the optical receiver 20 reports, to the optical transmitter 10, tap coefficients to be set for the FIR filter 13. Then the optical transmitter 10 controls the shape of the transmission spectrum of the optical signal according to the correction information. In particular, the FIR filter 13 performs pre-emphasis for the optical signal by using the reported tap coefficient.

As a result, pre-emphasis for the transmission spectrum is implemented. Transmission spectra and reception spectra provided when pre-emphasis is performed are represented by solid lines in FIG. 2.

As described above, the optical receiver 20 calculates tap coefficients for the FIR filter 13 according to a reception spectrum. The optical transmitter 10 controls the shape of a transmission spectrum by using the calculated tap coefficients. Accordingly, if the tap coefficients are correctly calculated, degradation of a reception spectrum that could be caused by PBN is reduced.

The correction information may be transmitted after being multiplexed in an optical signal to be transmitted from the optical transceiver 2 to the optical transceiver 1. In this case, the correction information may be superimposed on the optical signal by means of frequency modulation, e.g., frequency shift keying. The correction information may be reported to the optical transceiver 1 via a network management system that controls the entirety of the network. In this case, the network management system may be, for example, a software defined network (SDN).

In the example described above, the optical receiver 20 calculates tap coefficients, and the tap coefficients are reported to the optical transmitter 10. However, the present invention is not limited to this scheme. For example, information indicating a reception spectrum detected by the optical receiver 20 may be reported to the optical transmitter 10, and the optical transmitter 10 may calculate the tap coefficients. In this case, the information indicating the reception spectrum may be superimposed, in accordance with a frequency modulation scheme, onto an optical signal to be transmitted from the optical transceiver 2 to the optical transceiver 1.

Figure 3:
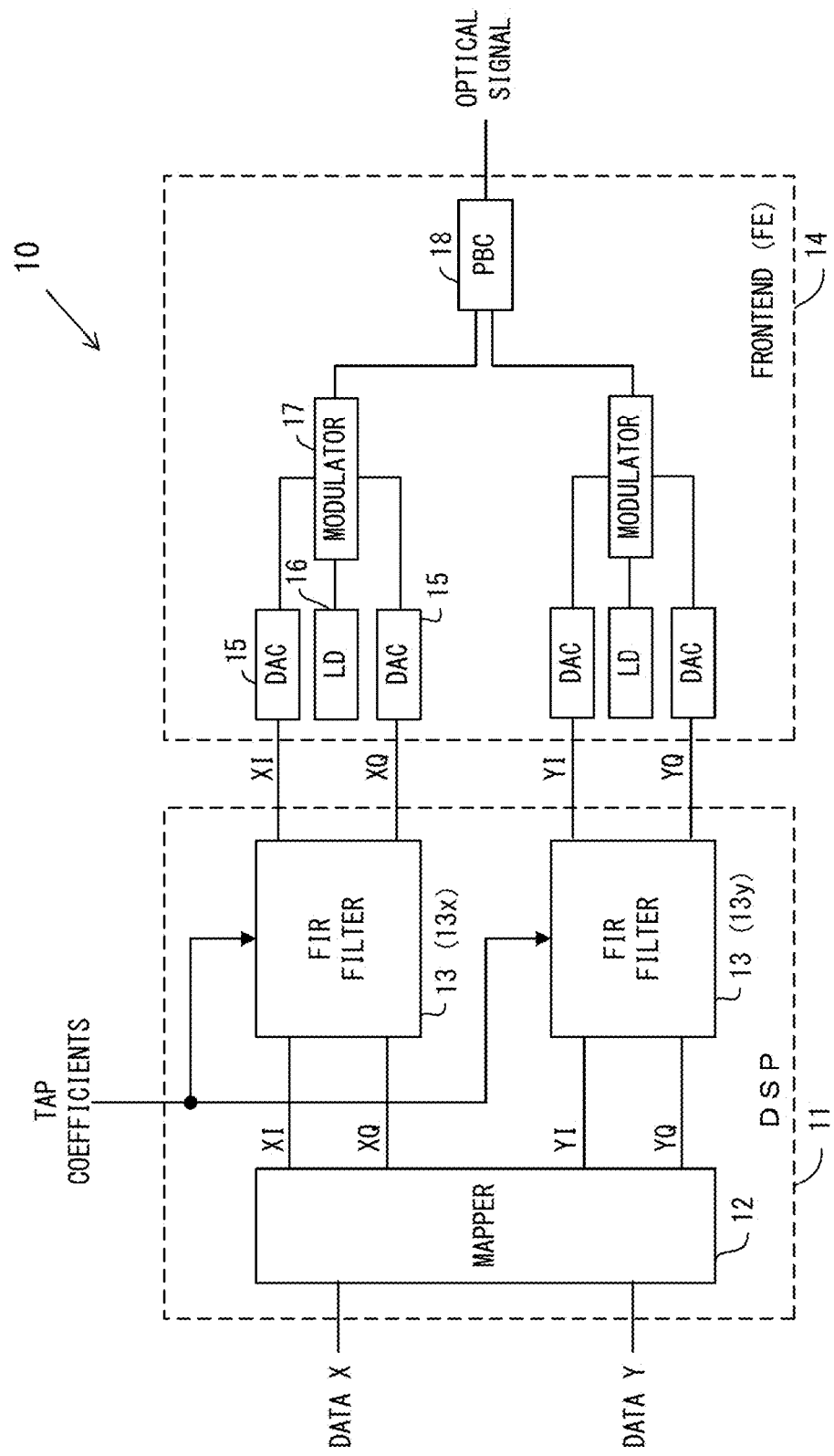
FIG. 3 illustrates an example of an optical transmitter.

FIG. 3 illustrates an example of the optical transmitter 10. As depicted in FIG. 3, the optical transmitter 10 includes a digital signal processor (DSP) 11 and a frontend circuit 14. The optical transmitter 10 may include circuits that are not depicted in FIG. 3.

The DSP 11 includes a mapper 12 and FIR filters 13 (13$x$, 13$y$). The DSP 11 may include functions that are not depicted in FIG. 3. For example, the DSP 11 may include a coding function for error correction.

The mapper 12 generates an electric field information signal from input data in accordance with a designated symbol rate and modulation format. In this example, the optical transmitter 10 generates a polarization multiplexed optical signal. Accordingly, the mapper 12 generates electric field information signals XI and XQ from data X and generates electric field information signals YI and YQ from data Y.

Using given tap coefficients, the FIR filter 13 filters an electric field information signal generated by the mapper 12. In this example, the FIR filter 13x filters electric field information signals XI and XQ, and the FIR filter 13y filters electric field information signals YI and YQ. In this example, a destination device that is a destination of an optical signal calculates the tap coefficients. The FIR filters 13x and 13y are given the same tap coefficients. The tap coefficients may be real numbers or complex numbers.

The frontend circuit 14 generates a modulated optical signal based on an electric field information signal generated by the DSP 11. In particular, a digital-to-analog converter (DAC) 15 converts an electric field information signal into an analogue signal. An output signal of the DAC 15 is amplified by a driver (not illustrated). A light source 16 generates continuous wave light of a specified wavelength. A modulator 17 is, for example, an I/Q optical modulator and generates a modulated optical signal by modulating the continuous wave light generated by the light source 16 with the electric field information signal.

In this example, a modulated optical signal X is generated from electric field information signals XI and XQ, and a modulated optical signal Y is generated from electric field information signals YI and YQ. A polarization beam combiner (PBC) 18 generates a polarization multiplexed optical signal by combining the modulated optical signals X and Y.

Figure 4:
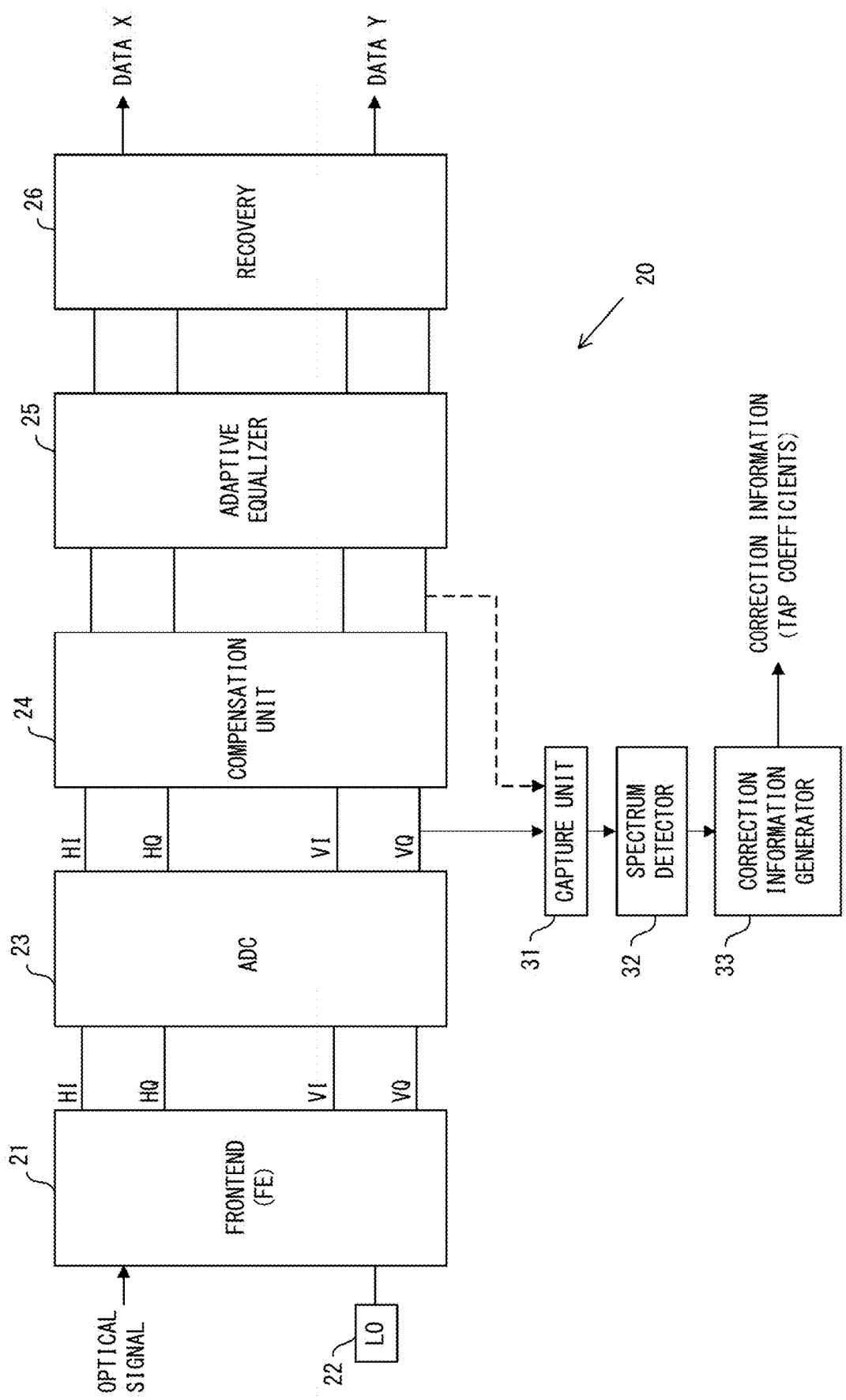
FIG. 4 illustrates an example of an optical receiver.

FIG. 4 illustrates an example of the optical receiver 20. As depicted in FIG. 4, the optical receiver 20 includes a frontend circuit 21, a local-light source (LO: Local Oscillator) 22, an analog-to-digital converter (ADC) 23, a compensation unit 24, an adaptive equalizer 25, and a recovery 26. The optical receiver 20 may further include other functions that are not illustrated in FIG. 4. The optical receiver 20 receives an optical signal generated by the optical transmitter 10 depicted in FIG. 3.

Using local light generated by the local-light source 22, the frontend circuit 21 generates electric field information signals (HI, HQ, VI, VQ) representing a received optical signal. The frequency of local light generated by the local-light source 22 is substantially the same as the frequency of the continuous wave light generated by the light source 16 of a source device. The ADC 23 converts the electric field information signal generated by the frontend circuit 21 into a digital signal.

The compensation unit 24 compensates for wavelength dispersion caused by an optical fiber transmission path. In addition to dispersion compensation, the compensation unit 24 may perform linear compensation and nonlinear compensation pertaining to an optical fiber transmission path. The compensation unit 24 includes a FIR filter and equalizes distortions with a low speed fluctuation and low polarization dependence. Accordingly, tap coefficients that are determined in advance according to, for example, characteristics of an optical fiber and a transmission distance are given to the FIR filter of the compensation unit 24.

The adaptive equalizer 25 compensates for a residual distortion in an output signal of the compensation unit 24. The adaptive equalizer 25 also performs polarization separation. The adaptive equalizer 25 is implemented by, for example, a butterfly-type FIR filter circuit that includes a plurality of FIR filters. In this case, tap coefficients are adaptively calculated for each FIR filter in accordance with, for example, a constant modulus algorithm (CMA).

The recovery 26 compensates for the difference between the optical frequency of the light source 16 implemented in the source device and the optical frequency of the local-light source 22 (i.e., frequency offset). The recovery 26 also estimates modulated phases of individual symbols according to a received signal for which a frequency offset has been compensated for. The recovery 26 decides the values of the individual symbols according to the estimated modulated phases. As a result, transmission data is recovered. In case where the optical transmitter 10 performs FEC, the optical receiver 20 performs error correction processing of recovered data.

The optical receiver 20 further includes a capture unit 31, a spectrum detector 32, and a correction information generator 33. The capture unit 31 acquires a digital signal output from the ADC 23. This digital signal represents electric field information of a received optical signal. The capture unit 31 captures at least one of digital signals HI, HQ, VI, and VQ. For example, in a case where the spectra of polarized waves orthogonal to each other are considered to be substantially the same, the capture unit 31 may acquire a digital signal that corresponds to either of the polarized waves. When electric field information of each polarized wave is expressed as a complex number, the capture unit 31 may acquire only the value of the real part of the electric field information or may acquire the values of the real part and imaginary part of the electric field information. When the capture unit 31 has acquired a plurality of digital signals, the capture unit 31 may output the average of these digital signals.

In the example depicted in FIG. 4, the capture unit 31 acquires a digital signal output from the ADC 23. However, the present invention is not limited to this configuration. In particular, the capture unit 31 may acquire another signal based on a received optical signal instead of a digital signal output from the ADC 23. For example, the capture unit 31 may acquire an electric field information signal in which a dispersion has been compensated for by the compensation unit 24. However, it is preferable for the capture unit 31 to acquire a signal before being processed by the adaptive equalizer 25.

The spectrum detector 32 detects a reception spectrum based on a digital signal acquired by the capture unit 31. In particular, the spectrum of a received optical signal is detected. According to the reception spectrum detected by the spectrum detector 32, the correction information generator 33 generates correction information for correcting the shape of the transmission spectrum of the optical signal in the source device that is the source of the optical signal (i.e., the optical transmitter 10 implemented in the optical transceiver 1). In this example, the correction information indicates tap coefficients of the FIR filter 13 that performs pre-emphasis for an optical signal in the optical transmitter 10. That is, the correction information generator 33 calculates tap coefficients to be set for the FIR filter 13.

The tap coefficients are reported to the source device that is the source of the optical signal. For example, when an optical signal is transmitted from the optical transceiver 1 to the optical transceiver 2 in the optical transmission system depicted in FIG. 2, the optical receiver 20 implemented in the optical transceiver 2 may calculate the tap coefficients. In this case, the optical transceiver 2 transmits the calculated tap coefficients to the optical transceiver 1. Then, the tap coefficients are set for the FIR filter 13 in the optical transceiver 1.

FIG. 5 illustrates advantageous effects of embodiments of the invention. In the following, the scheme pertaining to the embodiments of the invention depicted in FIGS. 3-4 will be compared with a scheme wherein correction information is generated according to tap coefficients calculated by the adaptive equalizer 25 (hereinafter referred to as a "comparative scheme").

When only one ROADM is implemented on a transmission path between the optical transceivers 1 and 2, the influence of PBN will be small, and a reception spectrum SA will assume a preferable shape. In this case, a symbol may be correctly recovered from a received optical signal without performing pre-emphasis, and hence no errors will occur.

When two ROADMs are implemented on the transmission path, the shape of a reception spectrum SB will be slightly degraded due to PBN. In this case, errors would occur if pre-emphasis is not performed. However, only few errors would occur, and such errors can be corrected by FEC. Whether the scheme pertaining to the embodiments of the present invention or the comparative scheme, an error will not occur when pre-emphasis is performed.

When four ROADMs are implemented on the transmission path, the influence of PBN will be large, and the shape of a reception spectrum SC will be severely degraded. In this example, the optical signal is degraded to the degree that the adaptive equalizer 25 cannot perform an appropriate equalization process. As an example, the optical signal may be degraded to the degree that the adaptive equalizer 25 cannot appropriately calculate the tap coefficients for the FIR filter due to a CMA not being converged.

In the comparative scheme, correction information for pre-emphasis is generated using the tap coefficients calculated by the adaptive equalizer 25. Hence, appropriate pre-emphasis will not be performed when four ROADMs are implemented on a transmission path. Accordingly, the optical receiver cannot recover data.

In the embodiments of the invention, by contrast, correction information for pre-emphasis is generated using a signal acquired on the input side of the adaptive equalizer 25. As an example, correction information may be generated according to the spectrum of a received optical signal. Hence, appropriate correction information is generated irrespective of whether the CMA of the adaptive equalizer 25 is converged, and the optical transmitter performs appropriate pre-emphasis. As a result, the optical receiver can recover data even when the shape of a reception spectrum is severely degraded.

In the example depicted in FIG. 4, the compensation unit 24, the adaptive equalizer 25, the recovery 26, the capture unit 31, the spectrum detector 32, and the correction information generator 33 are implemented by, for example, a processor system that includes a processor and a memory. In this case, the processor provides the functions of the compensation unit 24, the adaptive equalizer 25, the recovery 26, the capture unit 31, the spectrum detector 32, and the correction information generator 33 by executing a program stored in the memory. However, the functions of the compensation unit 24, the adaptive equalizer 25, the recovery 26, the capture unit 31, the spectrum detector 32, and the correction information generator 33 may be partly implemented by a hardware circuit.

The optical receiver 20 does not necessarily need to include the correction information generator 33. In this case, information indicating a reception spectrum detected by the spectrum detector 32 is transmitted to another device (e.g., source device or SDN). The other device calculates tap coefficients based on the reception spectrum. Then the tap coefficients are given to the FIR filter 13 of the source device. In the meantime, the optical receiver 20 does not necessarily need to include the spectrum detector 32 and the correction information generator 33. In this case, a digital signal indicating electric field information of a received optical signal is transmitted to another device. The other device detects a reception spectrum based on the digital signal indicting the electric field information so as to calculate the tap coefficients. Then the tap coefficients are given to the FIR filter 13 of the source device. However, the following descriptions are based on the assumption that the optical receiver 20 calculates the tap coefficients.

First Embodiment

In the first embodiment, the optical transmitter 10 in a source device measures a transmission spectrum in advance. The transmission spectrum is measured using, for example, an output signal of the mapper 12 depicted in FIG. 3 (one or more of electric field information signals XI, XQ, YI, and YQ). In this case, a transmission spectrum is obtained by performing fast Fourier transform (FFT) on the output signal of the mapper 12. However, the transmission spectrum may be measured using another method. For example, the transmission spectrum may be measured using an optical signal generated by the optical transmitter 10. Transmission spectrum information indicating the transmission spectrum is stored in a memory of the optical receiver 20 in a destination device. When measuring the transmission spectrum, the optical transmitter 10 generates an optical signal in the same communication mode (e.g., modulation format, symbol rate) as that in a data communication.

The capture unit 31 of the optical receiver 20 in the destination device acquires a digital signal output from the ADC 23. The digital signal indicates electric field information (HI, HQ, VI, VQ) of a received optical signal. The spectrum detector 32 detects a reception spectrum based on the digital signal acquired by the capture unit 31. In particular, the spectrum detector 32 detects the reception spectrum by performing FFT on the digital signal. The correction information generator 33 generates correction information based on the transmission spectrum and the reception spectrum.

FIGS. 6A-6C illustrate an example of a method for generating correction information in accordance with the first embodiment. In the first embodiment, tap coefficients are calculated for the FIR filter 13 of the optical transmitter 10 according to a transmission spectrum measured in advance and a reception spectrum detected by the spectrum detector 32.

The correction information generator 33 calculates a difference spectrum indicating the difference between a transmission spectrum and a reception spectrum, as depicted in FIG. 6A. The difference spectrum indicates a change in shape between the transmission spectrum and the reception spectrum. Accordingly, it is desirable that each of the transmission spectrum and the reception spectrum be normalized. For example, the normalization may involve adjusting the transmission spectrum and/or the reception spectrum in a manner such that the peak levels of the transmission spectrum and the reception spectrum (or the levels of regions in which the spectra become substantially flat) become identical with each other. In the example depicted in FIG. 6A, the transmission spectrum and the reception spectrum are substantially identical with each other in a frequency range of "±10 GHz".

The difference spectrum is obtained by subtracting the reception spectrum from the transmission spectrum. Accordingly, the difference spectrum indicates a reverse property of the spectrum of a pass band between the optical transmitter 10 and the optical receiver 20.

Subsequently, the correction information generator 33 calculates a time domain signal that corresponds to the difference spectrum by performing inverse FFT (IFFT) on the difference spectrum. FIG. 6B indicates an example of a time domain signal that corresponds to a difference spectrum. The horizontal axis of the graph in FIG. 6B indicates time.

FIG. 6C indicates a time domain signal that corresponds to the inside of the portion surrounded by the broken line in FIG. 6B. In this example, the FIR filters 13 implemented in the optical transmitter 10 have a 33-tap configuration. In particular, the FIR filters 13 are configured to process an input signal according to 33 tap coefficients.

According to a time domain signal that corresponds to a difference spectrum, the correction information generator 33 determines 33 tap coefficients to be assigned to the FIR filters 13. As an example, a tap coefficient to be assigned to the center tap of the FIR filters 13 (i.e., 17th tap) may be calculated according to a peak value of the time domain signal. Another tap coefficient may be determined according to the value of the time domain signal at a time shifted, by a specified period, from a time at which the time domain signal achieves the peak (time 17 in FIG. 6C). For example, the eighteenth tap coefficient may be determined according to the value of the time domain signal at a time one symbol time after time 17 (time 18 in FIG. 6C). Similarly, the nineteenth tap coefficient may be determined according to the value of the time domain signal at a time two symbol times after time 17 (time 19 in FIG. 6C). In this way, one set of tap coefficients is obtained.

The tap coefficients determined by the correction information generator 33 are reported to the optical transmitter 10 in the source device. Then, the optical transmitter 10 corrects the shape of a transmission spectrum by using the reported tap coefficients. In particular, the tap coefficients determined by the correction information generator 33 are assigned to the FIR filters 13 of the optical transmitter 10, as depicted in FIG. 3. In this example with this situation, the same tap coefficients are assigned to a FIR filter 13X that processes a signal transmitted using X polarization and a FIR filter 13Y that processes a signal transmitted using Y polarization. Each FIR filter 13 processes the input signal by using the tap coefficients assigned thereto. As a result, the shape of the transmission spectrum is corrected in accordance with the tap coefficients determined by the correction information generator 33. Accordingly, pre-emphasis for the optical signal is realized.

The tap coefficients determined by the correction information generator 33 are generated according to the difference spectrum described above. The difference spectrum indicates a reverse property of the spectrum of the pass band between the optical transmitter 10 in the source device and the optical receiver 20 in the destination device. Accordingly, when the above-described tap coefficients are given to the FIR filter 13 implemented in the optical transmitter 10, signal degradation that could be caused by the pass band between the optical transmitter 10 and the optical receiver 20 is compensated for. In other words, the shape of the spectrum of an optical signal that arrives at the optical receiver 20 (i.e., reception spectrum) becomes substantially the same as the shape of an original transmission spectrum. This will result in an improved quality of an optical signal that arrives at the optical receiver 20.

In the example described above, the optical receiver 20 in the destination device determines and reports tap coefficients to the optical transmitter 10. However, the present invention is not limited to this configuration. For example, information indicating a reception spectrum detected by the optical receiver 20 in the destination device may be reported to the optical transmitter 10 in the source device (or SDN), and the optical transmitter 10 may calculate tap coefficients. In this case, the correction information generator 33 is implemented in the optical transmitter 10. Alternatively, information indicating an output signal of the ADC 23 of the optical receiver 20 may be reported to the optical transmitter 10 (or SDN), and the optical transmitter may calculate tap coefficients. In this case, the spectrum detector 32 and the correction information generator 33 are implemented in the optical transmitter 10.

Second Embodiment

In the first embodiment, a transmission spectrum is measured in advance, and the spectrum of a pass band between the optical transmitter 10 and the optical receiver 20 is calculated according to the difference between the transmission spectrum and a reception spectrum. In the second embodiment, by contrast, the spectrum of a pass band between the optical transmitter 10 and the optical receiver 20 is estimated according to a reception spectrum without detecting a transmission spectrum.

The correction information generator 33 estimates the spectrum of a pass band between the optical transmitter 10 and the optical receiver 20 by using an approximation formula expressed as formula (1).

$$g(f) = 10\log_{10}\exp\left\{-2\log_e \sqrt{2}\left(\frac{2|f|}{BW + \alpha}\right)^{2\sigma}\right\} \quad (1)$$

$$-35 \le f \le 35, \quad \sigma = 35, \quad \alpha = 4.4$$

In this formula, g(f) indicates the spectrum of a pass band between the optical transmitter 10 and the optical receiver 20, f indicates a frequency. In this example, a frequency range extends from −35 GHz to 35 GHz. σ and α are real numbers determined in advance from, for example, a simulation. A spectrum estimated for a pass band between the optical transmitter 10 and the optical receiver 20 according to a reception spectrum may hereinafter referred to as an "estimated pass band spectrum".

FIG. 7 illustrates an example of a method for producing an estimated pass band spectrum. In this example, the estimated pass band spectrum is produced according to the following procedures 1-3.

Procedure 1: The correction information generator 33 determines a level that is lower than the maximum level of a reception spectrum by 15 dB (hereinafter referred to as a reference level). The correction information generator 33 detects the bandwidth of the reception spectrum with respect to the reference level. In the example of FIG. 7, a bandwidth BW is detected. The correction information generator 33 obtains an estimated pass band spectrum by assigning the value of the bandwidth BW to formula (1).

Procedure 2: The correction information generator 33 removes the influence of noise outside a signal band. In particular, the correction information generator 33 makes the gain of the estimated pass band spectrum to zero for frequency domains outside a bandwidth "SR+β", where SR indicates the symbol rate of a data signal, and β indicates a margin. In the example depicted in FIG. 7, symbol rate SR is 34 Gbaud, and margin β is 6 GHz. Hence, the bandwidth "SR+β" is 40 GHz. In this case, the gain of the estimated pass band spectrum is set to zero for frequency domains outside the frequency region of ±20 GHz. In the example of FIG. 7, the gain of frequency domains "b" are set to zero.

When the tap coefficients of the FIR filter 13 are produced according to an estimated pass band spectrum, substantially no pre-emphasis for an optical signal is performed for a frequency domain in which the gain of the estimated pass band spectrum is zero. Thus, the influence of pre-emphasis that could be caused by noise is removed or reduced by executing procedure 2.

Procedure 3: The correction information generator 33 determines the minimum level of the gain of the estimated pass band spectrum for a frequency domain inside the bandwidth "SR+β". In the example depicted in FIG. 7, the minimum level of the gain is −15 dB. Accordingly, a gain of −15 dB is set for frequency domains "c". A spectrum calculated according to formula (1) is output for a frequency domain in which the gain of the reception spectrum is −15 dB or greater (i.e., frequency domain "a").

FIGS. 8A-8C illustrate an example of a method for generating correction information in accordance with a second embodiment. In the second embodiment, tap coefficients are calculated for the FIR filter 13 according to the estimated pass band spectrum described above.

The correction information generator 33 performs IFFT on the reciprocals of the estimated pass band spectrum depicted in FIG. 8A. The reciprocals are calculated by inverting the signs of gain values for individual frequencies. For example, the reciprocal is zero for a frequency with a gain of zero. The reciprocal is 15 dB for a frequency with a gain of −15 dB.

FIG. 8B depicts a time domain signal obtained by performing IFFT on the reciprocals of the estimated pass band spectrum. FIG. 8C indicates a time domain signal that corresponds to the inside of the portion surrounded by the broken line in FIG. 8B. Note that the method for determining tap coefficients for the FIR filter 13 from a time domain signal in accordance with the second embodiment is substantially the same as the method in accordance with the first embodiment.

Tap coefficients determined by the correction information generator 33 are reported to the optical transmitter 10. Then, as seen in the first embodiment, the optical transmitter 10 corrects the shape of a transmission spectrum by using the reported tap coefficients.

In the second embodiment, as described above, the spectrum of a pass band between the optical transmitter 10 and the optical receiver 20 is estimated according to a reception spectrum without using a transmission spectrum. Then, using the estimated pass band spectrum, the shape of the transmission spectrum is corrected to compensate for signal degradation that could be caused by pass band narrowing between the optical transmitter 10 and the optical receiver 20. Thus, according to the pre-emphasis for the second embodiment, the quality of an optical signal that arrives at the optical receiver 20 can be improved even in a case where a transmission spectrum cannot be obtained.

Third Embodiment

In the first embodiment, tap coefficients are determined according to a difference spectrum. In the second embodiment, tap coefficients are determined according to an estimated pass band spectrum. However, both the difference spectrum and the estimated pass band spectrum include errors. In the third embodiment, accordingly, these spectra are corrected.

As an example, the gain value of a difference spectrum may be raised to the power of a scaling factor s. Accordingly, when the difference spectrum is expressed as G(f), the correction information generator 33 produces $\{G(f)\}^s$. The scaling factor s is a real number that is greater than zero and less than or equal to 1. The correction information generator 33 determines tap coefficients based on spectrum $\{G(f)\}^s$.

The scaling factor s is determined using specified index value. For example, the index value may be monitored while varying the value of s within a range from zero to 1, and an optimum value s is detected in accordance with the result of the monitoring. The index value is, for example, a Q factor such as a bit error rate. In this case, a value s is selected to provide the lowest bit error rate. The index value may be a clock recovery sensitivity. A method for improving a signal quality by using a scaling factor is described in, for example, Y. Mori et al. Joint Pre-, Inline-, and Post-Compensation of Spectrum Narrowing Caused by Traversing Multiple Optical Nodes, ECOC 2017.

In the third embodiment, as described above, spectra to be used to determine tap coefficients are corrected. Accordingly, pre-emphasis is performed using a more preferable tap coefficients, thereby improving the quality of an optical signal to reach the optical receiver 20.

In the second embodiment, as described above, pre-emphasis is performed according to a spectrum estimated using an approximation formula. Hence, the accuracy of the pre-emphasis in the second embodiment may be lower than that of the first embodiment. Hence, the correction in accordance with the third embodiment will preferably be applied to the estimated pass band spectrum used in the second embodiment.

When the correction in accordance with the third embodiment is applied to the second embodiment, a spectrum indicating the reverse property of an estimated pass band spectrum is raised to the power of the scaling factor s. In particular, the correction information generator 33 generates $\{1/T(f)\}^s$, where T(f) indicates the estimated pass band spectrum. The correction information generator 33 determines tap coefficients based on spectrum $\{1/T(f)\}^s$.

Fourth Embodiment

Figure 9A:
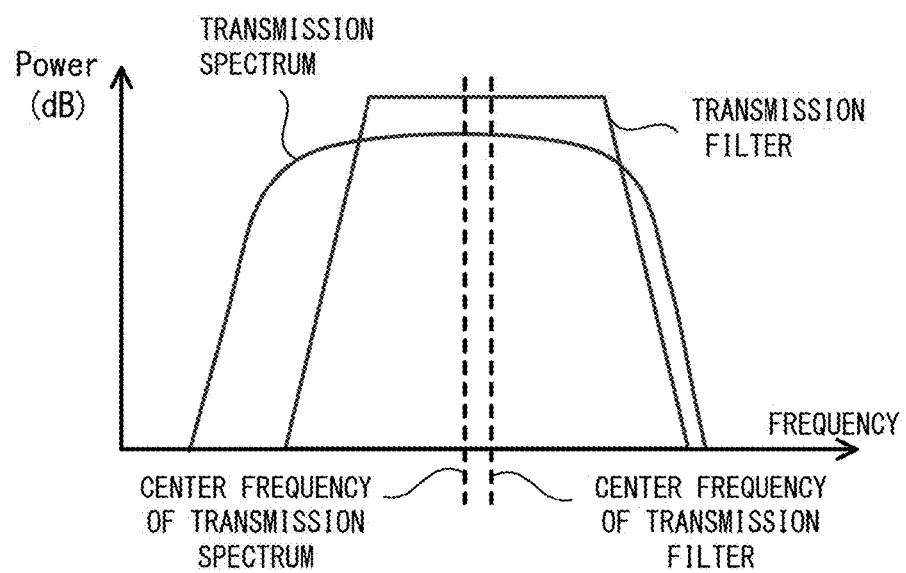
FIGS. 9A and 9B illustrate an example of a method for detecting a frequency shift.
Figure 9B:
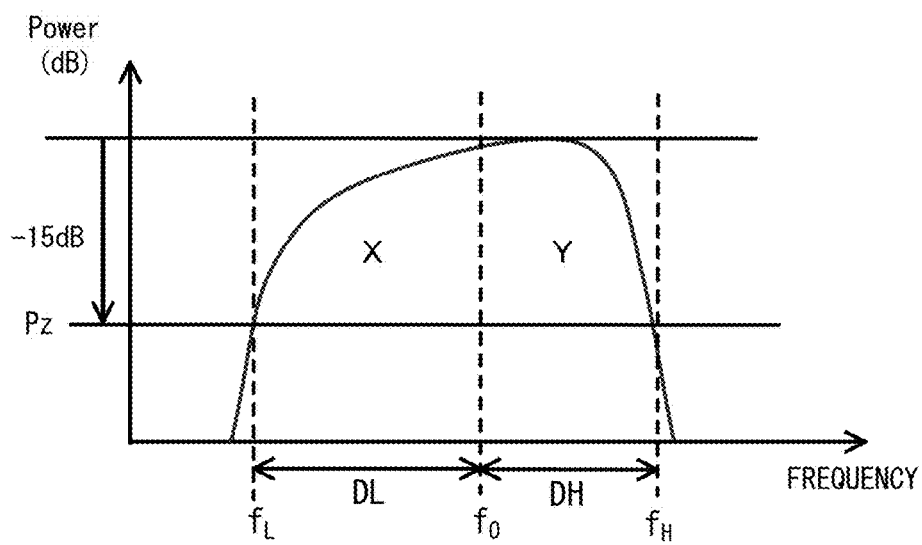

An optical signal transmitted from the optical transmitter 10 travels via a WSS implemented in a ROADM. In particular, the optical signal travels via a transmission filter of the WSS. The shape of a reception spectrum will be distorted when, as depicted in FIG. 9A, the center frequency of a transmission spectrum is shifted from the center frequency of the transmission filter. For example, the shape of the reception spectrum may become asymmetric, as depicted in FIG. 9B. In this case, the correction information generator 33 cannot calculate appropriate tap coefficients.

Accordingly, the correction information generator 33 estimates the amount of shift of the center frequency of the transmission spectrum from the center frequency of the transmission filter according to the shape of the reception spectrum. Then, the optical transmitter 10 adjusts the center frequency of the transmission spectrum according to the estimated value.

For example, the correction information generator 33 may detect a frequency $f_0$ for dividing the total power of the reception spectrum at a ratio of 1:1. In the example depicted in FIG. 9B, a frequency $f_0$ is determined such that regions X and Y become equal in area. In this case, a power $P_z$ that is lower than the peak power of the reception spectrum by a specified amount (e.g., by 15 dB) may be determined, and a frequency $f_0$ may be detected such that the power of the reception spectrum within a range between the peak power and $P_z$ is divided by a ratio of 1:1.

The correction information generator 33 detects frequencies $f_L$ and $f_H$ at which the power of the reception spectrum becomes $P_z$. DL indicates the difference between $f_0$ and $f_L$ and DH indicates the difference between $f_0$ and $f_H$. The correction information generator 33 generates a frequency correction instruction for making the difference between DL and DH less than a specified threshold.

The frequency correction instruction includes information indicating a direction in which the laser frequency of the optical transmitter 10 is to be shifted (hereinafter referred to as a frequency shift direction) and information indicating a frequency shift amount. The frequency shift direction is determined according to a comparison between DL and DH. In the example depicted in FIG. 9B, DH is smaller than DL. In this case, it is determined that the center frequency of the transmission spectrum is shifted to the lower-frequency side with respect to the center frequency of the transmission filter, as depicted in FIG. 9A. Accordingly, a frequency correction instruction for making the laser frequency of the optical transmitter 10 higher will be generated. Note that the frequency shift amount will be, for example, half of the difference between DL and DH.

However, the frequency shift amount may be determined using a specified index value. For example, the Q factor may be monitored while varying the frequency shift amount in a frequency shift direction that has been determined, and an optimum frequency shift amount may be detected in accordance with the result of the monitoring. This method will shorten the time needed to determine an optimum laser frequency in comparison with a method that involves simply sweeping a laser frequency.

The optical transmitter 10 adjusts the laser frequency (i.e., the oscillation frequency of the light source 16) in accordance with the frequency correction instruction. This will result in a reduced difference between the center frequency of the transmission spectrum and the center frequency of the transmission filter of the WSS on the transmission path, and the shape of the reception spectrum will be improved, thereby allowing the correction information generator 33 to obtain an appropriate tap coefficients. Hence, an optical signal with an improved quality will arrive at the optical receiver 20.

Figure 10:
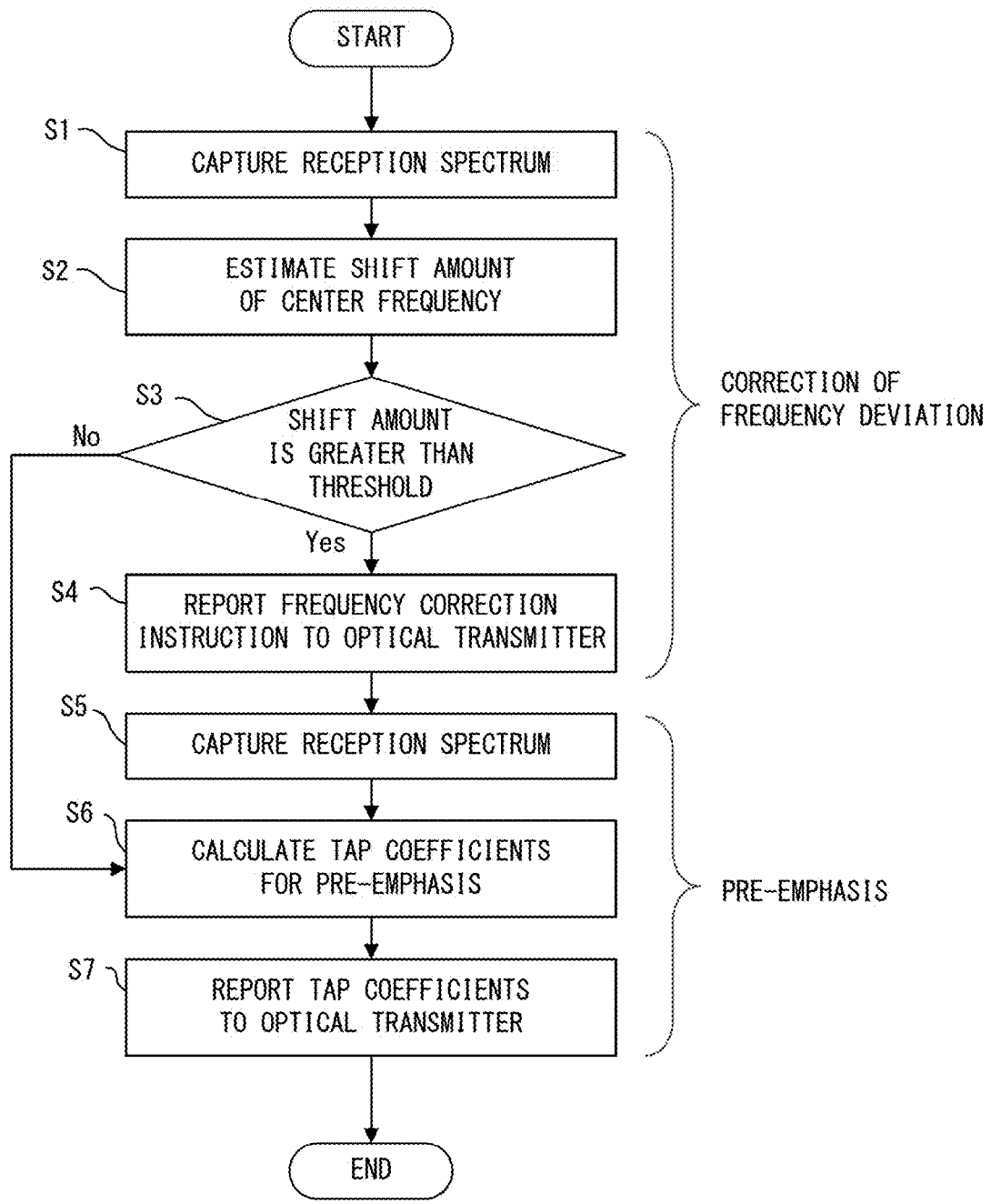
FIG. 10 is a flowchart illustrating an example of an optical transmission method in accordance with a fourth embodiment.

FIG. 10 is a flowchart illustrating an example of an optical transmission method in accordance with a fourth embodiment. This flowchart indicates operations of the optical receiver 20.

In S1, the optical receiver 20 captures a reception spectrum. In particular, the capture unit 31 captures a received signal, and the spectrum detector 32 detects a reception spectrum.

In S2-S3, the correction information generator 33 estimates the shift amount of the center frequency of a transmission spectrum from the center frequency of a transmission filter according to the shape of the reception spectrum. When the shift amount is greater than a specified threshold, the correction information generator 33 generates a frequency correction instruction in S4. The frequency correction instruction indicates, for example, a frequency shift direction and a frequency shift amount. The frequency correction instruction is reported to the optical transmitter 10. In this example, the optical transmitter 10 adjusts the laser frequency in accordance with the frequency correction instruction.

After the process of correcting the frequency deviation is finished, the optical receiver 20 captures the reception spectrum in S5. In particular, the reception spectrum of the optical signal for which the laser frequency has been adjusted is captured. In S6, the correction information generator 33 calculates tap coefficients for pre-emphasis by using the reception spectrum. The tap coefficients are calculated using any one of the methods in accordance with the first to third embodiments. In S7, the optical receiver 20 reports the calculated tap coefficients to the optical transmitter 10.

When the shift amount is less than or equal to the threshold (S3: No), the processes of S4-S5 are skipped. Accordingly, the optical receiver 20 calculates tap coefficients based on the reception spectrum obtained in S1.

<Report of Correction Information>

An optical transceiver that has received an optical signal transmits correction information (tap coefficients in this example) determined using the above-described method to a source optical transceiver. For example, correction information generated by the optical transceiver 2 in the optical transmission system 100 depicted in FIG. 1 may be reported to the optical transceiver 1. As an example, correction information may be reported from the optical transceiver 2 to the optical transceiver 1 via a network management system for managing a network. The network management system is implemented by, for example, an SDN.

However, the optical transmission system 100 may report the correction information via a transmission path for transmitting data. In this case, the correction information is multiplexed with an optical signal to be transmitted from the optical transceiver 2 to the optical transceiver 1. For example, the correction information may be superimposed on the optical signal by means of frequency modulation such as frequency shift keying (FSK).

Figure 11:
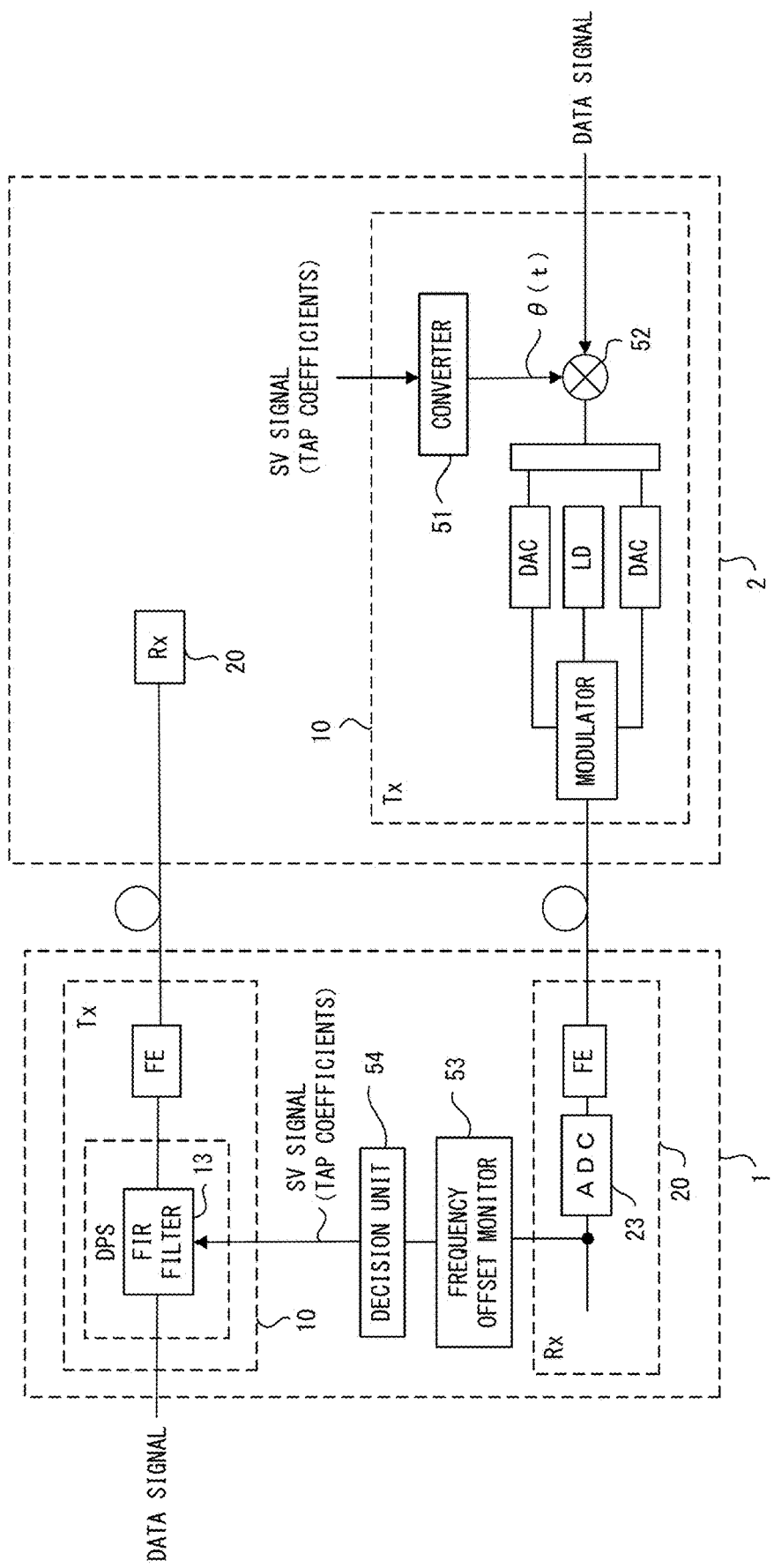
FIG. 11 illustrates an example of a method for transmitting correction information by means of frequency modulation.

FIG. 11 illustrates an example of a method for transmitting correction information by means of frequency modulation. In this example, the optical transceiver 2 sets, in an SV signal, tap coefficients calculated according to a reception spectrum. The SV signal is used to transmit control information. The bit rate of the SV signal is sufficiently low in comparison with the symbol rate of a data signal.

A converter 51 converts each bit or each symbol of the SV signal into corresponding phase information θ. The processing performed by the converter 51 is expressed as, for example, formula (2), where m indicates the value of the SV signal.

$$\theta(t) = \exp(2\pi j \Delta f t m(t)) \qquad (2)$$

A superimposition unit 52 adds phase information θ that corresponds to the SV signal to phase information indicating the data signal. That is to say, a frequency offset that corresponds to the SV signal is added to the data signal. As a result, the SV signal is superimposed on the data signal. Then, the optical transmitter 10 of the optical transceiver 2 generates an optical signal indicating the data signal on which the SV signal is superimposed.

The optical transceiver 1 receives the optical signal transmitted from the optical transceiver 2. Accordingly, an output signal of the ADC 23 of the optical transceiver 1 indicates the data signal on which the SV signal is superimposed.

A frequency offset monitor 53 detects a frequency offset from the output signal of the ADC 23. For example, the frequency offset monitor 53 may detect frequency offset components that correspond to the SV signal by using a low-pass filter for removing frequency components of the symbol rate of the data signal. A decision unit 54 decides each bit or each symbol of the SV signal according to the detected frequency offset. As a result, the tap coefficients calculated by the optical transceiver 2 are reproduced.

The method depicted in FIG. 11 allows a source node and a destination node to autonomously perform pre-emphasis for a transmission spectrum without the intervention of a network management system. In addition, tap coefficients are reported to a source node as correction information even when the signal quality is low and the adaptive equalizer 25 is not converged.

Fifth Embodiment

In the first to fourth embodiments, tap coefficients are calculated according to a reception spectrum, and the optical transmitter 10 performs pre-emphasis for a transmission spectrum by using the tap coefficients. In the fifth embodiment, by contrast, a plurality of sets of tap coefficients are prepared in advance, and the optical transmitter 10 selects a preferable set of tap coefficients based on system information pertaining to a communication between a source node and a destination node.

FIG. 12 illustrates an example of an optical transmitter in accordance with the fifth embodiment. In this example, the optical transmitter 10 is supplied with system information. The system information indicates the number of WSSs implemented on a transmission path leading to a destination node. However, the system information may include another type of information. For example, the system information may include information indicating the spacing between wavelength channels of WDN signals and information indicating the symbol rate of the WDN signals. The system information is supplied from a network management system such as an SDN. Alternatively, the system information may be supplied from a user or a system manager.

A plurality of sets of tap coefficients are stored in a memory 63 of the optical transmitter 10. Each tap coefficient set is prepared in accordance with respect to the number of WSSs implemented on the transmission path. For example, a tap coefficient set 1 may be determined to increase the signal quality at the receiver node when one WSS is implemented on the transmission path. A tap coefficient set 2 may be determined to increase the signal quality at the receiver node when two WSSs are implemented on the transmission path.

A decision table 61 indicates a relation between the number of WSSs and a preferable tap coefficient set. When the optical transmitter 10 is supplied with system information, a tap coefficient set preferable for the number of WSSs is identified according to the decision table 61. A selector 62 selects a tap coefficient set preferable for the number of WSSs and supplies the FIR filter 13 with this tap coefficient set. The DSP 11 performs pre-emphasis based on the selected tap coefficient set.

Figure 13A:
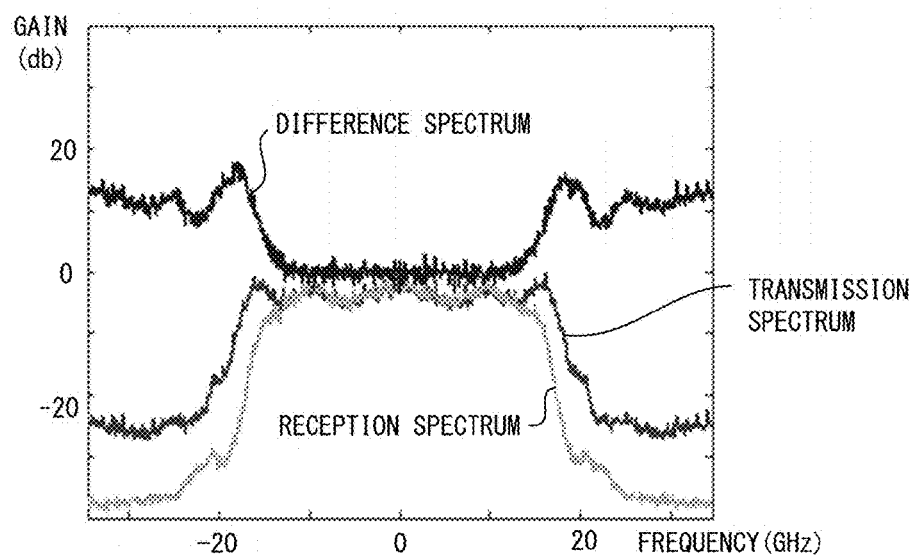
FIGS. 13A and 13B illustrate an example of a comparison between qualities that correspond to selected tap coefficients.
Figure 13B:
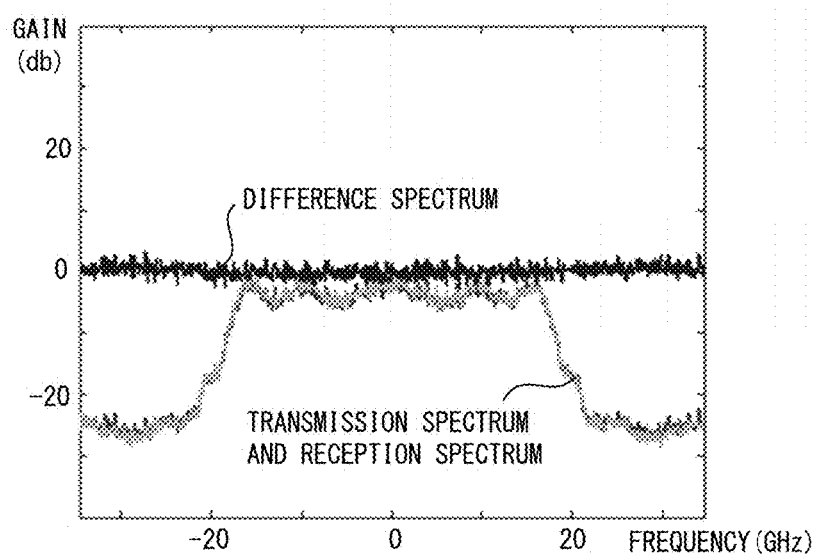

When pre-emphasis for a transmission spectrum is performed using the method described above, the optical receiver 20 may estimate whether an appropriate tap coefficient set has been selected. For example, when an appropriate tap coefficient set has been selected, the difference between the transmission spectrum and the reception spectrum may be small as depicted in FIG. 13A, and a substantially flat difference spectrum may be provided. By contrast, when an appropriate tap coefficient set has not been selected, the difference between the transmission spectrum and the reception spectrum may be large as depicted in FIG. 13B, and a difference spectrum that is significantly varied with frequency may be provided. Hence, the degree of accuracy of a tap coefficient set selected by the optical transmitter 10 may be estimated by calculating a difference spectrum (estimated pass band spectrum in the second embodiment). Accordingly, it is determined whether an appropriate tap coefficient set has been selected.

The estimated result described above is transmitted to, for example, the network management system. Alternatively, the network management system may estimate the accuracy of a tap coefficient set. In this case, according to the estimated result, the network management system may decide whether to change the tap coefficient set. For example, when the difference between a transmission spectrum and a reception spectrum is large, the network management system may decide that the tap coefficient set needs to be changed. In this case, the optical transmitter 10 changes the tap coefficient set in accordance with the result of the decision of the network management system.

The optical receiver 20 may calculate tap coefficients by using the correction information generator 33, as seen in the first and second embodiments. The optical receiver 20 may decide, according to the calculated tap coefficients, whether an appropriate tap coefficient set has been selected by the optical transmitter 10. For example, it may be decided according to the distribution of tap coefficients calculated by the correction information generator 33 whether an appropriate tap coefficient set has been selected by the optical transmitter 10.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:
1. An optical transmission device comprising:
   a frontend circuit configured to convert an optical signal received via an optical network into an electric signal;
   a converter configured to convert an output signal of the frontend circuit into a digital signal;
   an equalizer provided on an output side of the converter and configured to equalize the digital signal or a second digital signal that is generated based on the digital signal;
   a recovery configured to recover a symbol from an output signal of the equalizer;
   a spectrum detector configured to detect a reception spectrum of the optical signal based on the digital signal or the second digital signal;
   a correction information generator configured to generate, according to a difference spectrum indicating a difference between the transmission spectrum that is stored in a memory and the reception spectrum detected by the spectrum detector, correction information for correcting a shape of a transmission spectrum of the optical signal in a source device that is a source of the optical signal; and a transmitter configured to transmit the correction information to the source device, wherein
the correction information generator normalizes the transmission spectrum and the reception spectrum in a manner such that the peak levels of the transmission spectrum and the reception spectrum become identical with each other and calculates the difference spectrum by subtracting the normalized reception spectrum from the normalized transmission spectrum.

2. The optical transmission device according to claim 1, wherein
the correction information indicates tap coefficients of a digital filter that corrects the shape of the transmission spectrum of the optical signal in the source device,
and the correction information generator converts the difference spectrum into a time domain signal and obtains the tap coefficients according to the time domain signal.

3. An optical transmission device comprising:
a frontend circuit configured to convert an optical signal received via an optical network into an electric signal;
a converter configured to convert an output signal of the frontend circuit into a digital signal;
an equalizer provided on an output side of the converter and configured to equalize the digital signal or a second digital signal that is generated based on the digital signal;
a recovery configured to recover a symbol from an output signal of the equalizer;
a spectrum detector configured to detect a reception spectrum of the optical signal based on the digital signal or the second digital signal;
a correction information generator configured to generate, according to the reception spectrum detected by the spectrum detector, correction information for correcting a shape of a transmission spectrum of the optical signal in a source device that is a source of the optical signal; and
a transmitter configured to transmit the correction information to the source device, wherein
the correction information generator
estimates, according to a shape of the reception spectrum by using a formula below, a pass band spectrum indicating a property of a pass band between the source device and the optical transmission device, $$g(f) = 10\log_{10}\exp\left\{-2\log_e\sqrt{2}\left(\frac{2|f|}{BW+\alpha}\right)^{2\sigma}\right\}$$

wherein f, σ, and α being specified constants and BW indicating a bandwidth detected from the reception spectrum, and
generates the correction information according to the pass band spectrum.

4. The optical transmission device according to claim 3, wherein
the correction information generator makes a pass band spectrum outside a signal band of the optical signal be zero.

5. The optical transmission device according to claim 3, wherein
the correction information generator generates the correction information according to a result of raising a reverse property of the pass band spectrum to the power of a scaling factor that is greater than zero and less than or equal to 1.

6. The optical transmission device according to claim 5, wherein
the correction information generator monitors a quality of the optical signal while varying the scaling factor and determines a value of the scaling factor in accordance with a result of the monitoring.

7. The optical transmission device according to claim 1, wherein
according to a symmetry of a shape of the reception spectrum, the correction information generator generates a frequency correction instruction for correcting a center frequency of the optical signal in the source device, and
the transmitter transmits the frequency correction instruction to the source device.

8. An optical transmission system for transmitting an optical signal from a first optical transmission device to a second optical transmission device, the optical transmission system comprising:
a digital filter configured to control a shape of a transmission spectrum of an optical signal in the first optical transmission device;
a frontend circuit configured to convert, in the second optical transmission device, an optical signal received from the first optical transmission device over an optical network into an electric signal;
a converter configured to convert, in the second optical transmission device, an output signal of the frontend circuit into a digital signal;
an equalizer provided on an output side of the converter in the second optical transmission device and configured to equalize the digital signal or a second digital signal generated according to the digital signal;
a recovery configured to recover, in the second optical transmission device, a symbol from an output signal of the equalizer;
a spectrum detector configured to detect a reception spectrum of the optical signal according to the digital signal or the second digital signal; and
a correction information generator configured to generate, according to a difference spectrum indicating a difference between the transmission spectrum that is stored in a memory and the reception spectrum detected by the spectrum detector, correction information for correcting a shape of a transmission spectrum of the optical signal, wherein
the digital filter controls the shape of the transmission spectrum of the optical signal according to the correction information, and
the correction information generator normalizes the transmission spectrum and the reception spectrum in a manner such that the peak levels of the transmission spectrum and the reception spectrum become identical with each other and calculates the difference spectrum by subtracting the normalized reception spectrum from the normalized transmission spectrum.

9. The optical transmission system according to claim 8, wherein
the spectrum detector and the correction information generator are provided in the second optical transmission device, and
the second optical transmission device superimposes the correction information on an optical signal to be transmitted from the second optical transmission device to the first optical transmission device with a frequency modulation scheme.

10. The optical transmission system according to claim 8, wherein the spectrum detector is provided in the second optical transmission device, the correction information generator is provided in the first optical transmission device, and the second optical transmission device superimposes information indicating the reception spectrum on an optical signal to be transmitted from the second optical transmission device to the first optical transmission device with a frequency modulation scheme.

11. An optical transmission device comprising:

a digital signal processor including a digital filter and configured to generate a digital signal based on transmission data;

a memory configured to store a plurality of sets of tap coefficients, each of the plurality of sets of tap coefficients serving to cause the digital filter to perform different filter processing; and a frontend circuit configured to generate an optical signal based on the digital signal, wherein the digital signal processor selects a set of tap coefficients according to system information indicating a number of wavelength selective switches implemented on a transmission path between the optical transmission device and a destination device that is a destination of the optical signal and generates the digital signal by using the digital filter in which the selected set of tap coefficients is configured.

12. An optical transmission system for transmitting an optical signal from a first optical transmission device to a second optical transmission device, wherein the first optical transmission device includes a digital signal processor including a digital filter and configured to generate a digital signal based on transmission data, a memory configured to store a plurality of sets of tap coefficients, each of the plurality of sets of tap coefficients serving to cause the digital filter to perform different filter processing, and a frontend circuit configured to generate an optical signal based on the digital signal, the second optical transmission device includes a frontend circuit configured to convert an optical signal received from the first optical transmission device into an electric signal, a converter configured to convert an output signal of the frontend circuit into a digital signal, an equalizer provided on an output side of the converter and configured to equalize the digital signal or a second digital signal that is generated based on the digital signal, a recovery configured to recover a symbol from an output signal of the equalizer, a spectrum detector configured to detect a reception spectrum of the optical signal based on the digital signal or the second digital signal, and a correction information generator configured to generate, according to the reception spectrum detected by the spectrum detector, correction information for correcting a shape of a transmission spectrum of the optical signal in the first optical transmission device, the digital signal processor selects a set of tap coefficients according to system information indicating a number of wavelength selective switches implemented on a transmission path between the first optical transmission device and the second optical transmission device and generates the digital signal by using the digital filter in which the selected set of tap coefficients is configured, and an accuracy of the selected set of tap coefficients is estimated according to the correction information or a difference between a spectrum of the optical signal generated by the frontend circuit and the reception spectrum detected by the spectrum detector.

* * * * *